J. B. POLO.
TIRE ALARM.
APPLICATION FILED JAN. 27, 1912.
1,049,142.
Patented Dec. 31, 1912.
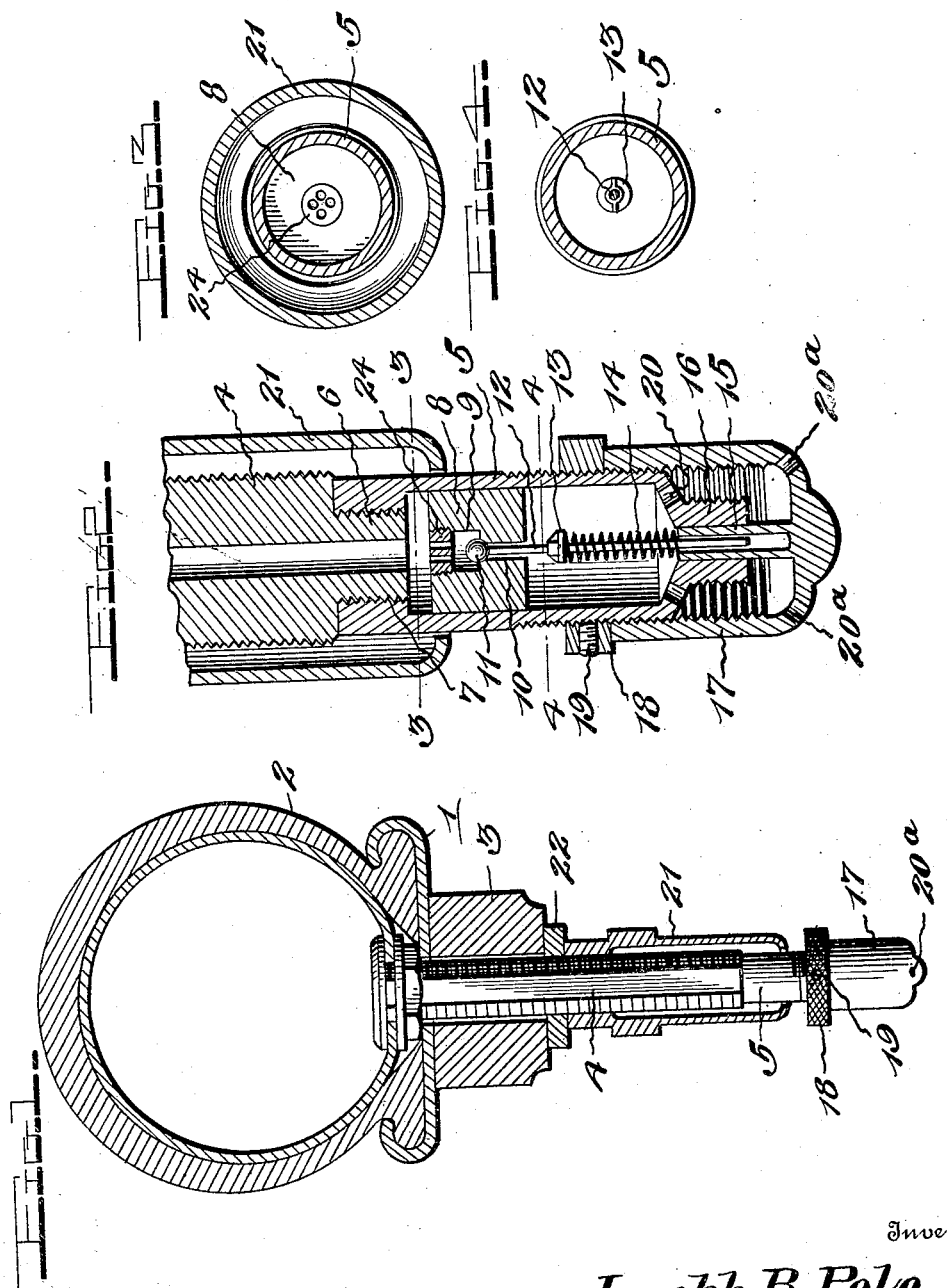
Inventor
Joseph B. Polo,
By Watson E. Coleman.
Attorney
Witnesses
Chas. L. Grieshauer.
A. B. Norton.

UNITED STATES PATENT OFFICE.

JOSEPH B. POLO, OF CLEAR LAKE, SOUTH DAKOTA.

TIRE-ALARM.

1,049,142.

Specification of Letters Patent.   Patented Dec. 31, 1912.

Application filed January 27, 1912.   Serial No. 673,926.

*To all whom it may concern:*

Be it known that I, JOSEPH B. POLO, a citizen of the United States, residing at Clear Lake, in the county of Deuel and State of South Dakota, have invented certain new and useful Improvements in Tire-Alarms, of which the following is a specification, reference being had to the accompanying drawings.

This invention pertains to new and useful improvements in automobile appliances or accessories, and the invention has for its primary object a simple durable and efficient construction of attachment to be secured to the ordinary valve stem of the inner tube of a pneumatic tire whereby when the air pressure is lowered to a predetermined degree, the device will sound an alarm and thereby apprise the occupant of the vehicle that a tire has become flat or that its air pressure has been deflated beyond a desirable point.

The invention also has for its object a simple device of this character parts of which may be easily manufactured, readily assembled and which will be durable and not liable to get out of order. And the invention also aims to generally improve this class of device and to render them more durable and commercially desirable.

With these and other objects in view as will more fully appear as the description proceeds, the invention consists essentially in a tire alarm including a casing adapted to be secured to the nipple end of a tire valve stem, a permanent magnet carried by the casing and having an opening extending therethrough and leading to the atmosphere, and a spring pressed valve unseating device adapted to be pressed against a spherical valve which is normally adapted to close the opening through the magnet, whereby when the air pressure in the tire is lowered to a predetermined degree, the spring pressed valve unseating device, which has been tensioned to the required point, will move the valve away from its seat against the magnetic influence of the magnet, and thereby permit the air to issue from the outer end of the device in such a manner as to sound an alarm.

The invention also consists in certain constructions, arrangements and combinations of the parts that I shall hereinafter fully describe and claim.

For a full understanding of the invention reference is to be had to the following description and accompanying drawings, in which, Figure 1 is a transverse sectional view through a pneumatic tire and wheel felly and rim showing the application of my invention; Fig. 2 is an enlarged longitudinal sectional view of the device; Fig. 3 is a transverse sectional view on the line 3—3 of Fig. 2; and Fig. 4 is a similar view on the line 4—4 of Fig. 2.

Referring to the drawing, the numeral 1 designates a wheel rim, 2 a pneumatic tire, 3 the felly on which the rim is mounted, and 4 the ordinary or conventional valve stem, the valve of which is removed in carrying out my invention. It is to be understood that any or all of these parts may be of any desired or approved form and construction, such as are now employed in connection with pneumatic tires for the wheels of automobiles or similar vehicles.

My improved tire alarm comprises a preferably cylindrical casing 5, which is formed at one end with interior screw threads 6 by which it is adapted to be detachably connected to the usual exteriorly threaded nipple 7 that is formed on the outer end of the stem 4 for the usual attachment of the ordinary dust excluding and valve removing cap and wrench.

In the inner end of the casing 5 a permanent magnet 8 is held, said magnet as best illustrated in Fig. 2, being formed with a recessed inner face forming a socket as shown, the same being designated 9, said socket communicating with a preferably centrally disposed and longitudinally extending bore 10 leading to the outer face of the magnet. 11 designates a relatively small and light metallic valve which is preferably spherical as shown and which is adapted to be held by magnetic force against the inner end of the longitudinal opening 10.

Extending in the opening 10 and bearing against the ball valve 11 is a rod 12 which, with its correlated parts constitutes a valve unseating device, said rod being formed with a collar 13 against which one end of a coil spring 14 bears. The outer end of the coil spring 14 bears against an exteriorly smooth tubular stem 15 which guides the outer end of the rod 12 in its longitudinal movement, together with the opening 10, and which is mounted in an opening formed in the outer reduced end 16 of the casing 5. The tubular stem 15 is preferably formed as an integral part of the cap 17 which is intended to be manually turned whereby to vary the tension of the spring 14, as required. A stop collar 18 screws on the casing 5 and is held in adjusted position thereon by a set screw 19. This collar 18 is adapted to limit the inward movement of the cap 17 on the casing 5, whereby, when the cap is removed to apply the tire pump for the purpose of inflating the tire, the collar will serve as an abutment and determine the proper point of again placing the spring 14 under a tension when the cap is subsequently screwed back into place.

From the foregoing description in connection with the accompanying drawings, the operation of my improved tire alarm will be apparent. In the practical use of the device, it will of course be understood that the ball valve 11 will be held by magnetic attraction against the inner end of the opening 10, whereby to maintain the desired air pressure within the inner tube of the tire. Should the air pressure be reduced, owing to a small leak in the tube, say forty (40) pounds to a square inch, the spring 14, which has been placed under the required tension will act to move the rod 12 inwardly so as to push the ball valve 11 away from the inner end of the opening 10, whereby the air issuing through the opening 10, and the ports 20 and 20$^a$ that are formed in the casing 5, and cap 17 respectively, as illustrated in Fig. 2, will produce an audible signal and thereby apprise the occupant of the car that the tire has become partially deflated. To again inflate the tire, it is only necessary to remove a cap 17 and withdraw the spring 14 and valve unseated rod 12 and to then apply the ordinary pump nipple to the reduced end 16 of the casing 5. The magnetic attraction will tend to hold the ball valve 11 on its seat and to return it to its seat during the intermittent actions of the pump piston, even though the device should be held in more or less of a vertical position inverted from the position illustrated in Figs. 1 and 2 of the accompanying drawing. It is to be particularly noted, as best illustrated in Figs. 2 and 4, that the inner end of the collar 13 is formed so as to avoid closing the passage 10 when removed against the outer face of the magnet 8 by the pressure of the spring 14.

21 designates the ordinary dust excluding sleeve, which is secured upon the valve stem 4, being formed at its outer end with an opening to accommodate the casing 5, and 22 designates the ordinary stem retaining nut adapted to be screwed up against the felly 3. Preferably, in order to prevent the ball valve 11 (Fig. 2) from entirely moving out of the socket 9 of the magnet 8, a small apertured screw plug 24 is screwed in the outer end of the socket, as clearly illustrated in the drawing.

While the accompanying drawing illustrates what I believe to be the preferred embodiment of my invention, it is to be understood that the invention is not limited thereto, but that various changes may be made in the construction, arrangement and proportions of the parts without departing from the scope of the invention, as defined in the appended claims.

Having thus described this invention, what is claimed is:—

1. An alarm of the character described, including a casing, a permanent magnet held in the casing and formed with a socket terminating in a valve seat, and an opening leading outwardly from the valve seat, a ball valve adapted to be held on said seat by magnetic attraction, spring pressed means tending to unseat the valve against the force of the magnetic attraction, and means carried by the casing for producing an audible signal upon the unseating of the valve.

2. An alarm of the character described, including a casing, a permanent magnet mounted in said casing and having a valve seat and an opening leading outwardly therefrom, a valve adapted to be held on said seat by magnetic attraction, a rod extending into said opening and engaging said valve, an adjustable spring encircling said rod and connected thereto at one end to press the rod inwardly, and a bushing adjustably mounted in the casing and engaging the other end of the spring to vary the tension thereof, the casing being formed with means for producing an audible signal upon the unseating of the valve.

3. An alarm of the character described, including a casing, a permanent magnet secured therein and formed with a valve seat and with an opening leading outwardly therefrom, a bushing adjustably secured to the outer end of the casing, a cap carrying said bushing, an inwardly spring pressed rod guided in said bushing and extending into said opening and bearing at its inner end against the valve, the outer end of the casing and the cap being formed with ports, and a stop collar adjustably carried by the casing and designed for engagement by the inner end of the cap for the purpose specified.

4. An alarm of the character described, including a casing, a permanent magnet mounted in said casing and formed with a valve seat, and with an opening leading outwardly therefrom, a valve adapted to be held on said seat by magnetic attraction and movable inwardly to open position, a rod extending in through said opening and bearing at its inner end on the valve, the rod being provided intermediate its ends with a collar, a bushing slidable in the outer end of the casing, a spring coiled around said rod and bearing against the bushing and the collar, a set collar adjustably held on the casing, and a cap carrying said bushing and screwing on the outer end of the casing and adapted to engage the set collar, the outer end of the casing and the cap being formed with communicating ports for the purpose specified.

In testimony whereof I hereunto affix my signature in the presence of two witnesses.

JOSEPH B. POLO.

Witnesses:
 GEO. S. LIVINGSTON,
 FREDERICK S. STITT.